UNITED STATES PATENT OFFICE.

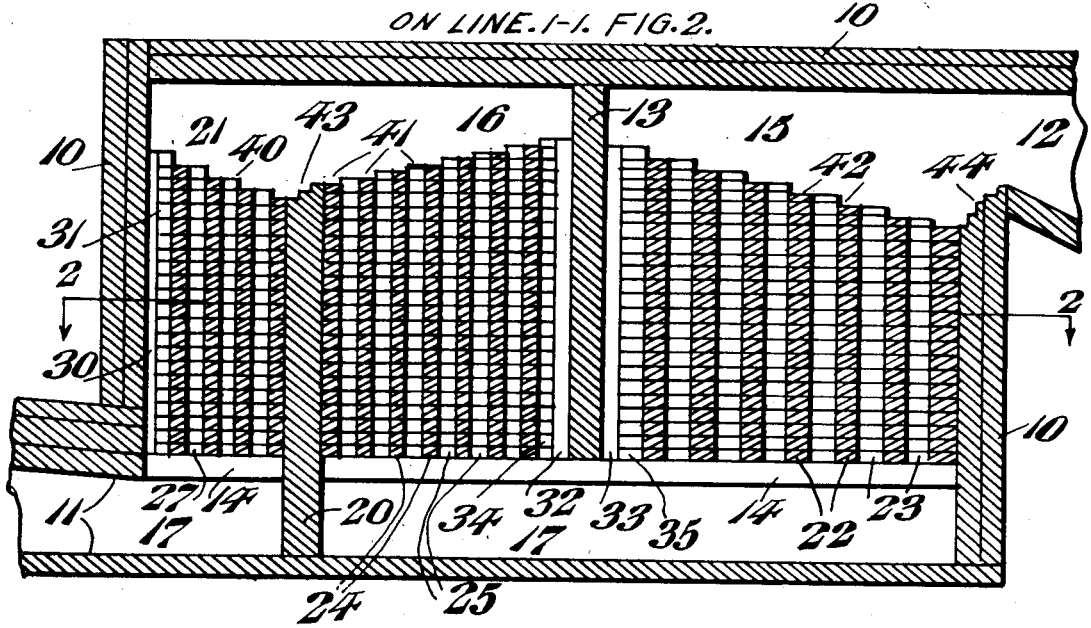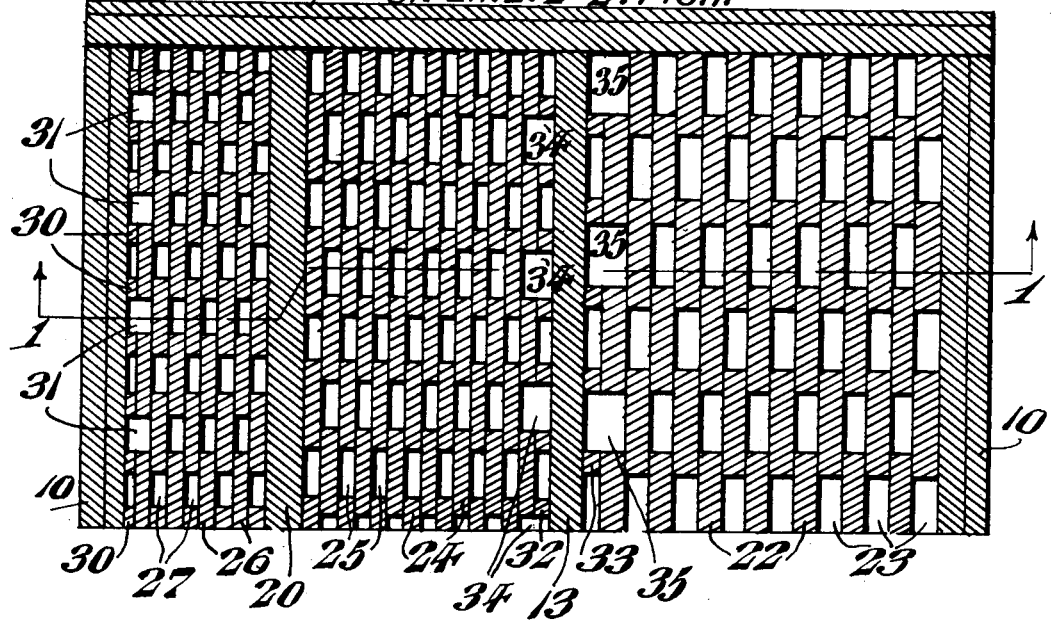

WILLIAM GAST, OF PHILADELPHIA, PENNSYLVANIA.

REGENERATOR.

1,361,709.  Specification of Letters Patent.  Patented Dec. 7, 1920.

Application filed December 12, 1919. Serial No. 344,383.

*To all whom it may concern:*

Be it known that I, WILLIAM GAST, a citizen of the United States, and a resident of Philadelphia, county of Philadelphia, State of Pennsylvania, have invented certain new and useful Improvements in Regenerators, of which the following is a specification.

Some of the objects of the present invention are to provide an improved construction in regenerators for open-hearth furnaces or any other furnace suitable for use with a regenerator; to provide means for substantially eliminating friction of the moving gases in a regenerator; to provide means for evenly distributing the gases while flowing through a regenerator; to provide means for maintaining a substantially uniform flow of gases through a regenerator; to provide a construction wherein the checker structure bears a predetermined relation to the temperature of the incoming or outgoing gases and with respect to the furnace and flue parts; to provide a checker construction wherein swirling or choking of the moving gases is prevented; to provide means for maintaining a checker construction for a regenerator substantially free from collected dust, cinders or other deposits; and to provide other improvements as will hereinafter appear.

In the accompanying drawings, Figure 1 represents a longitudinal sectional elevation taken on line 1—1 of Fig. 2 of a regenerator embodying one form of the present invention; and Fig. 2 represents a fragmentary section on line 2—2 of Fig. 1 showing the arrangement of the checker construction in Fig. 1.

Referring to the drawings one form of the present invention consists of a setting 10 of brick or any suitable material, forming the regenerator chamber or chambers and having a gas inlet 11 at one end and a gas outlet 12 at the opposite end, though these openings are reversed in function for a reverse flow of gas.

For providing a tortuous flow of the gases or air through the regenerator the roof of the setting 10 has a downwardly extending baffle wall 13 which joins a longitudinally disposed supporting structure 14 to form a chamber 15 in communication with the outlet 12, and a chamber 16 communicating with the chamber 15 by way of a passage 17 formed by spacing the supporting structure 14 from the foundation or bed of the setting 10. Between the inlet 11 and the baffle wall 13 there is a second baffle 20 extending upwardly from the foundation of the setting 10 and passing through the structure 14 but terminating a predetermined distance from the roof of the setting 10 in order to form a chamber 21 communicating at one end with the chamber 16 and at the other end communicating with the inlet 11 by way of the portion of the passage 17 cut off by the baffle wall 20. Thus a continuous tortuous passage for the gases or air is formed whereby the latter traverse the chambers 21, 16 and 15 successively and utilizing also the passage 17.

For the purpose of causing a substantially uniform flow of the gases and air through the regenerator, allowing for expansion while heating and preventing choking or clogging at the exit end, the chambers 21, 16 and 15 are suitably proportioned to provide successively larger chambers from the inlet 11 to the outlet 12 so that the gas and air first enters the heated chamber 21, then passes over the baffle wall 20 and expands under the absorbed heat into the larger chamber 16. Leaving this chamber 16 in a further heated condition the products enter the largest chamber 15 from which they pass to the furnace by way of the outlet 12. While no specific chamber dimensions are here given it will be understood that the respective chambers are proportioned with respect to the temperatures ordinarily encountered and the expansion of the products under those temperatures, while the invention is not limited in its scope to any particular relative proportioning.

In order to obtain the usual regenerative action the chamber 15 is provided with a checker construction formed of bricks 22 arranged in spaced relation to form a plurality of straight, parallel open-ended conduits 23 through which the products are directed from the passage 17 to the outlet 12. A similar checker construction formed of bricks 24 is arranged in the chamber 16 to form a plurality of straight parallel, open-ended conduits 25 through which the products are directed to the passage 17 after leaving the chamber 21. The chamber 21 is also provided with a checker construction formed of bricks 26 laid to form a plurality of straight, parallel open-ended conduits 27 through which the products are directed from the inlet 11 by way of passage 17 to the chamber 16. All of the several checkers terminate a suitable distance from the roof of the setting 10 to form unobstructed portions at one end of each of the chambers as will be understood.

As a means for further allowing for the expansion of the products the bricks 22 of the checker in chamber 15 are of larger dimensions than the bricks 24 of the checker in chamber 16 and consequently the conduits 23 are larger than the conduits 25. Similarly the bricks 24 are of larger dimensions than the bricks 26 of the checker in the chamber 21, thus forming larger conduits 25 than the conduits 27, so that the general result of the checkers is to form successive expansion stages for the products through the different sized chambers 21, 16 and 15.

For the purpose of equalizing the draft through the respective checker constructions and to reduce the friction, it is preferable to provide the interior of the end wall of the setting 10 adjacent the inlet 11 with a plurality of projections 30 so spaced and arranged as to form with the rows of abutting bricks 26 a plurality of open-ended channels 31 which are relatively larger than the conduits 27 but parallel with respect thereto. It is also preferable to provide a set of projections 32 on the side of the baffle wall 13 facing the chamber 16 and another set of projections 33 on the opposite side of the same wall 13 facing the chamber 15. The projections 32 are larger than the projections 30 and abut the bricks 24 in a manner to form a plurality of open-ended channels 34 of larger cross-sectional area than the conduits 25 but parallel with respect thereto. The projections 33 are larger than the projections 32 and abut the bricks 22 in a manner to form a plurality of open-ended channels 35 of larger cross-sectional area than the conduits 23 but parallel with respect thereto. The result of the construction is to cause the products entering the chamber 21 to be distributed evenly through the checker conduits due to the fact that the increased draft caused by the channels 31 draws the gases more or less away from the baffle 20. When the gases and air leave the chamber 21 they are drawn across the top of the checkers in chamber 16, being subjected to a relatively strong pull caused by the large channels 34 and are consequently more evenly distributed across the inlets to the conduits 25. An action similar to that of chamber 21 takes place in chamber 15 due to the location of the large channels 35 in close proximity to the entrance to the chamber 15.

In order to cause the upper surfaces of the several checkers to be kept free from deposits and maintained clean, the top rows of brick in each chamber are arranged in stepped relation as indicated at 40, 41 and 42. Thus at the upper end of the chamber 21 the stepped formation is inclined downwardly toward the baffle wall 20, then in the chamber 16 the stepped arrangement ascends from the wall 20 to the wall 13, and in the chamber 15 the stepped formation is again downward from the wall 13 to the end wall of the setting 10 and terminates adjacent the outlet 12. Thus the arrangement is such that the gases sweep over the stepped surfaces in a direction to cause deposits to be swept into the channels of the checkers and finally collect in the passage 17 where they do not affect the efficient operation of the regenerator. This construction not only maintains the bricks clean for heat absorption but accomplishes the result without reducing the brick surface area on top of the checkers. In this connection also it should be noted that it is preferable, though not necessary in all instances, to step the top surface of the wall 20 as shown at 43 and also similarly step the top wall of the setting 10 at the outlet and as indicated at 44.

While the foregoing description has referred to the checker construction as formed of parallel conduits, it will be understood that this is only the preferred construction and that such conduits may be variously arranged without departing from the invention. In some types of heated products it may be found desirable to form the checker conduits so that tortuous paths are provided but the action and operation of the distributing channels remain the same.

Furthermore the variation in the brick sizes in the several chambers allows for efficient and effective absorption of heat and its giving off whereby a material saving in fuel is made possible.

It will be understood also under reverse operation (that is where the checkers are being heated by waste products) that the distributing channels pull the hot products across the top of the checkers and cause a uniform heating in all parts of the respective checkers.

It will now be apparent that a complete unitary regenerator has been devised wherein the areas of flues, ports, uptakes, or channels, and block volumes have been proportioned in a definite relation to the expansion of the air and gases and in such a manner as to produce a greater velocity to the air and gases entering the furnace bath than there is entering the regenerator or regenerators. Naturally in the reverse operation where gases leave the furnace through the regenerator the same proportions will apply though there will be a stage contraction of the gases instead of an expansion.

Furthermore, by the present construction the entering gases and air will be hotter, giving better combustion and more available heat units. Also less steam is required for forcing gases into furnace thereby relieving the gas producers and maintaining a steam pressure in them consistent with good gas making. While air, steam and producer gases have been more particularly referred to it will be understood that the action is the same where the regenerator is used with products from oil and tar and that the velocity of the air in connection with the velocity of the flame causes a hotter, sharper flame and consequently proportionately less fuel than is used in the present practice.

Although only one of the forms in which this invention may be embodied has been described herein, it is to be understood that the invention is not limited in its application to any specific form but might be embodied in various forms without departing from this invention or the scope of the appended claims.

Having thus described my invention, I claim and desire to protect by Letters Patent of the United States:

1. In a regenerator, a setting having an inlet, an outlet and a plurality of chambers, two of said chambers communicating respectively with said inlet and said outlet, and a checker construction arranged in each chamber, one of said checker constructions having a plurality of gas distributing channels relatively larger respectively in cross-sectional area than the respective checker channels in the same chamber, said distributing channels being located in close proximity to the gas inlet to that chamber.

2. In a regenerator, a setting having an inlet, an outlet and a plurality of chambers, two of said chambers communicating respectively with said inlet and said outlet, and a checker construction arranged in each chamber, one of said checker constructions having a plurality of gas distributing channels relatively larger respectively in cross-sectional area than the respective checker channels in the same chamber, said distributing channels being located at the opposite side of that chamber from the side where gas mixtures enter.

3. In a regenerator, a setting having an inlet, an outlet and a plurality of chambers, two of said chambers communicating respectively with said inlet and said outlet, a checker construction in each chamber and arranged to form a continuous, tortuous path for gas mixtures entering said setting, said checker constructions being successively proportioned in a predetermined manner to increase in size from one end of said setting to the other, and separate means in each checker construction for distributing the gas mixture evenly through each checker.

4. In a regenerator, a setting having an inlet, an outlet and a plurality of chambers, two of said chambers communicating respectively with said inlet and said outlet, a checker construction in each chamber and arranged to form a continuous, tortuous path for gas mixtures entering said setting, each checker construction having two sets of open-ended parallel channels, one of said sets being composed of larger channels than the other sets and each set of each checker construction being composed of larger channels than the corresponding set of the preceding checker construction.

5. In a regenerator, a setting having an inlet and an outlet, means forming a plurality of chambers in said setting providing a tortuous path for gases traversing said chambers, and a checker construction having a stepped top portion arranged to be laterally swept by gas mixtures whereby dirt and gaseous deposits are prevented from collecting on said checker construction.

6. In a regenerator, a setting having an inlet and an outlet, means forming a plurality of chambers in said setting providing a tortuous path for gases traversing said chambers, and a checker construction in each chamber, one of said checker constructions having a stepped top portion inclined in the direction of the moving gases.

7. In a regenerator, a setting having an inlet and an outlet, means forming a plurality of chambers in said setting providing a tortuous path for gases traversing said chambers, and a checker construction in each chamber, one of said checker constructions having a stepped top portion inclined upwardly across a portion of the path of the moving gases.

8. In a regenerator, a setting having an inlet and an outlet, means forming a plurality of chambers in said setting providing a tortuous path for gases traversing said chambers, and a checker construction in each chamber, each checker having a stepped top portion arranged to be laterally swept by the moving gases.

9. In a regenerator, a setting having an inlet and an outlet, means forming a plurality of chambers in said setting providing a tortuous path for gases traversing said chambers, a checker construction in each chamber, each checker having a stepped top portion arranged to be laterally swept by the moving gases, and a plurality of sets of channels arranged respectively in said checkers, each set being adjacent one end of the adjacent stepped portion.

10. In a regenerator, a setting having an inlet and an outlet, means forming a plurality of chambers in said setting providing a tortuous path for gases traversing said chambers, a checker construction in each chamber, each checker having a stepped top portion arranged to be laterally swept by the moving gases, and a plurality of sets of channels arranged respectively in said checkers, each set being adjacent one end of the adjacent stepped portion, and said sets being successively larger in cross-sectional area.

11. In a regenerator, a setting having an inlet and an outlet, means forming a plurality of chambers in said setting providing a tortuous path for gases traversing said chambers, and a checker construction in each chamber, each checker having a stepped top portion arranged to be swept by the moving gases, and the bricks of successive checker constructions increasing in size, whereby the checker volumes are successively increased.

12. In a regenerator, a setting having an inlet and an outlet, means forming a plurality of chambers in said setting providing a tortuous path for gases traversing said chambers, a checker construction in each chamber, each checker having a stepped top portion arranged to be swept by the moving gases, and the bricks of successive checker constructions increasing in size, whereby the checker volumes are successively increased, and means to cause even distribution of the gases moving through said checkers.

Signed at Philadelphia, in the county of Philadelphia and State of Pennsylvania, this 11th day of December, A. D. 1919.

WILLIAM GAST.